(12) United States Patent
Iwasaki et al.

(10) Patent No.: US 6,696,207 B1
(45) Date of Patent: Feb. 24, 2004

(54) PIGMENT COMPOSITION, DISPERSION CONTAINING THE SAME, AND COLOR RESIST FOR COLOR FILTER

(75) Inventors: Kenji Iwasaki, Kokubu (JP); Ichiro Kawase, Narita (JP); Shingo Araki, Osaka (JP); Haruo Murata, Sawara (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/674,276

(22) PCT Filed: Mar. 1, 1999

(86) PCT No.: PCT/JP99/00966

§ 371 (c)(1),
(2), (4) Date: Oct. 30, 2000

(87) PCT Pub. No.: WO00/52103

PCT Pub. Date: Sep. 8, 2000

(51) Int. Cl.⁷ .............................. C09B 67/22; G02B 5/20
(52) U.S. Cl. ..................... 430/7; 430/270.1; 430/281.1; 106/499
(58) Field of Search ...................... 430/7, 270.1, 281.1; 106/499

(56) References Cited

U.S. PATENT DOCUMENTS

| 2,526,345 A | 10/1950 | Giambalvo |
| 4,236,933 A | 12/1980 | Torre |
| 4,810,297 A | 3/1989 | Takei et al. |

FOREIGN PATENT DOCUMENTS

| JP | 50-050460 A | * 5/1975 |
| JP | 4-310901 | 11/1992 |
| JP | 6-194826 | 7/1994 |
| JP | 6-194827 | 7/1994 |
| JP | 10-158538 | 6/1998 |
| JP | 10-268124 | 10/1998 |

OTHER PUBLICATIONS

Database WPI—Section Ch, Week 199250, Derwent Publications Ltd., London, GB; Class A89, AN 1992–412556 & JP 04 310901 A (Fuji Photo Film Co. Ltd), Nov. 2, 1992.

* cited by examiner

*Primary Examiner*—John A. McPherson
(74) *Attorney, Agent, or Firm*—Armstrong, Kratz, Quintos, Hanson & Brooks, LLP

(57) ABSTRACT

The present invention employs ester compounds such as butyl acetate, oleyl acetate and the like that are typically employed in solvents and other applications as an agent for improving the fluidity of a pigment dispersion liquid. The pigment composition of the present invention includes a pigment and the aforementioned ester compound as essential components. A pigment dispersion liquid in which the present invention's pigment composition is dispersed in a solvent or the like demonstrates a great improvement in pigment dispersibility and dispersion liquid flow properties. When the present invention's pigment composition and pigment dispersion liquid are employed in a color filter, it is possible to obtain a uniform paint film having high contrast.

25 Claims, No Drawings

PIGMENT COMPOSITION, DISPERSION CONTAINING THE SAME, AND COLOR RESIST FOR COLOR FILTER

TECHNICAL FIELD

The present invention relates to a pigment composition that can be employed as a coating material for automobiles, painted steel sheets, building materials, cans and the like; as a printing ink such as lithographic printing ink, rotogravure ink, flexographic ink, or ink-jet printing ink; or as the material for a color filter. The present invention further relates to a pigment dispersion liquid in which this pigment composition is dispersed.

RELATED ART

Various properties are required of pigments. For example, they must be readily dispersed in the dispersion resin or solvent system (i.e., they must have good dispersibility), the liquid containing the dispersed pigment must have excellent flow qualities, and the paint film formed by coating the liquid with the dispersed pigment must have high gloss, brightness, and resistance to weather. Moreover, in the case of color filters in particular, the paint film must have high contrast and high transparency. In order to satisfy these requirements, a variety of treatments are carried out to a crude pigment obtained by synthesis. The material rendered as a result of these treatments can then be employed as a pigment.

Specifically, after carrying out such processes as adjusting the crystal form, and adjusting the shape and size of the primary particles in the process for rendering a pigment from the crude pigment material, various treatments are performed using pigment derivatives, rosins, modified rosins, body extender pigments, resins for microencapsulation, and the like, with the objective of stabilizing the particle diameter, inhibiting crystal growth and aggregation, providing good dispersibility to the various resin and solvent systems used to disperse the pigment, providing suitable flow qualities to the pigment dispersion liquid, improving the gloss of the paint film, and improving the brightness of the paint film.

However, few pigments possess the numerous properties described above. This is because a pigment having these numerous properties would be very expensive, so that its practical use would not be feasible. Namely, many treatments would have to be carried out in order to provide a pigment with these numerous properties, thus the cost for treatment agents would increase. Moreover, there would be more operational steps as the number of treatments grew, so that the price of the pigment would rise. Accordingly, rather than using an expensive pigment with superior properties, it is actually the usual practice to select an inexpensive resin from among the various products that is suitable to the resin or solvent system to be used. However, these inexpensive pigments frequently sacrifice any number of the properties that are required of a pigment.

The conventional technology relating to pigment compositions will now be discussed as follows.

Untreated pigments in which the crystal form of the crude pigment and the shape and size of the primary particles have been adjusted in the pigment rendering process, but no surface treatment employing the aforementioned treatment agents has been performed, are inexpensive. However, the range within which they can be employed is limited. Moreover, in a disperse system, these pigments are prone to such problems as crystal growth and aggregation, and poor dispersion liquid flow properties.

On the other hand, rosins and modifiable rosins which have shown promise in lithographic, typographic and other such printing ink applications ink are frequently employed in treatments when forming the pigment, in order to maintain a uniform crystal system and particle diameter in the pigment. However, these treatment agents impair the flow properties of the pigment dispersion liquid, and it has thus been indicated that their use in applications that require good flow properties is problematic.

In pigment compositions consisting of an organic pigment and a body extender pigment, there are cases in which the body extender pigment functions only as an extending agent. In many cases however, the body extender pigment may also serve such functions as improving the dispersibility of the pigment and the flow properties of the pigment dispersion liquid, or have such characteristics as providing a high gloss, high brightness paint film. In addition, many pigment compositions employ body extender pigments because they are inexpensive. However, problems with body extender pigments have also been cited, such as the brittleness of the paint film when these pigments are employed in industrial coating materials where hardness is required of the paint film, or low contrast when these pigments are employed in color filters of liquid crystal displays.

Pigment compositions in which pigment derivatives and dyes have been added in addition to the pigments are effective in improving pigment dispersibility, controlling crystal growth and aggregation, and improving the flow properties of the pigment dispersion liquid. In addition, these compositions are not readily affected by various solvents. Further, the paint film often demonstrates an improvement in gloss, brightness, transparency, and contrast. In addition, another characteristic of these pigment compositions is their low cost. Specific examples of such pigment compositions include the pigment C.I. Pigment Red 177 containing 4,4'-diamino-1,1'-dianthraquinonyl-3,3'-disulfonic acid that is disclosed in Japanese Patent Application, First Publication No. Sho 63-172772; copper phthalocyanine pigment containing copper phthalocyanine sulfonic acid pigment derivative disclosed in Japanese Patent Application, First Publication No. Hei 4-146968; and halogenated copper phthalocyanine pigment containing halogenated copper phthalocyanine sulfonic acid pigment derivative disclosed in Japanese Patent Application, Second Publication No. Sho 41-2466. However, as the amount of pigment derivative and dye increase, the paint film's resistance to light, weather, heat and the like fall, and the pigment derivative and dye often bleed to the surface of the paint film.

Much research has been carried out in recent years, with microencapsulated pigments being highly appraised with respect to the flow properties, stability and pigment dispersibility of the dispersion liquid in which the pigment composition is dispersed. However, due to the high costs associated with the pigment treatment, the use of these microencapsulated pigments is problematic in industrial fields where a low cost material is required.

A metal salt pigment composition of chromic acid subjected to an ester treatment as disclosed in Japanese Patent Application, First Publication No. Sho 62-184063 may be cited as an example of a conventional technique employing a carboxylic acid ester compound that is related to the present invention. This composition intends an improvement in heat stability, chemical stability, and color fastness to light.

The conventional technology for improving the nature of the liquid and paint film of the pigment dispersion liquid will now be explained.

The pigment dispersion liquid is formed of a pigment composition, resin, dispersion enhancer, solvent and the like. A material having the function of improving the nature of the pigment dispersion liquid can be included in one or more of the compositional starting materials. Typically, in a coating material, numerous colors are produced by holding the resin and solvent constant, and changing the pigment. For this reason, the function of improving the nature of the pigment dispersion liquid is generally provided to the pigment composition or the dispersion enhancer. In particular, as a known technique related to the present invention, an example may be cited in which pigment dispersibility and the like are improved by employing ester carboxylic acid compounds as the vehicle or dispersing agent, such as disclosed in Japanese Patent Applications, First Publication Nos. Sho 47-6771, Sho 60-215651, Sho 63-214330, Hei 2-129147, and Hei 3-227371, Published Japanese Translation No. Hei 4-506225 of a PCT international publication, Japanese Patent Application, First Publication No. Hei 7-25824, and Published Japanese Translation No. Hei 7-506621 of a PCT international publication. However, the chemical structures of the ester carboxylic acid compounds disclosed in these references are not equivalent to the present invention.

In the industrial field of resin coloring agents, Japanese Patent Applications, First Publication Nos. Sho 52-5856, Sho 54-105150, Sho 60-90232, Sho 62-68834, and Hei 04-298572, among others, may be cited as examples that employ a ester carboxylic acid compounds. However, these compounds also do not intersect the present invention with respect to chemical structure. Further, while Japanese Patent Application, First Publication No. Sho 50-50460 can be cited as an example employing an ester carboxylic acid compound that has a structure which is similar to the present invention, its technical field, goal of use, and effect are different from the present invention.

As described above, typical conventional methods for realizing at low cost an improvement in the conditions of the liquid (pigment dispersibility, flow properties) and paint film (gloss, brightness, contrast, transparency, etc.) of a pigment dispersion liquid include, with regard to the pigment composition, a method employing a pigment composition containing a pigment derivative or dye; and, with regard to the pigment dispersion liquid, a method that combines a solvent, dispersion enhancer, resin, and pigment composition suitable to the disperse system, or a method that employs a material that functions to improve properties as a starting material for composing the pigment dispersion liquid.

Thus, high pigment dispersibility, and excellent dispersion liquid flow properties and storage stability are required as properties of the pigment dispersion liquid. Moreover, the paint film formed must have high gloss, brightness, transparency and contrast. Accordingly, it is the objective of the present invention to develop a pigment composition and pigment dispersion liquid that have superior pigment dispersibility and flow properties for the various resin and solvent systems used for pigment dispersion. This is accomplished in the present invention by employing an effective and inexpensive treatment agent that is different from the aforementioned treatment agents (body extender pigments, rosins, etc.) which have in the past led to impairment of the properties of the dispersion liquid and paint film of the pigment dispersion liquid. In particular, it is the objective of the present invention to improve suitability with respect to the gloss and contrast of the paint film in a color filter by increasing pigment dispersibility.

DISCLOSURE OF THE INVENTION

An improvement in pigment dispersibility can be realized by microdispersing the pigment, and then stabilizing the microdispersed pigment. Microdispersion of the pigment depends on the capabilities of the dispersing device. In order to stabilize a microdispersed pigment, it is necessary to maintain the initial microdispersed state so that crystallization and aggregation of the pigment particles does not progress. For this reason, a special approach is required with respect to the starting materials forming the pigment composition, pigment dispersion liquid and the like, and the method of making the pigment composition and the pigment dispersion liquid.

Accordingly, the present inventors prepared a pigment composition that contained a pigment and a Compound 1, expressed by the following formula (I), as essential components, and were successful at improving pigment dispersibility as a result. At the same time, by employing Compound 1 as an agent for improving flow properties, the present inventors were able to improve the flow properties of the dispersion liquid, which is another objective of the present invention. The composition containing this pigment and Compound 1 is denoted as "Pigment Composition 1" in this specification.

The pigment (sometimes referred to as "main pigment", versus a "sub-pigment" described below) included in Pigment Composition 1 is even more effective in the case where it is an acidic pigment in particular. Note that "acidic pigment" as employed here indicates one or two or more pigments from among pigments having an acidic functional group, pigments subjected to an acid treatment, and pigments which are electron acceptors.

(I)

(Where, R1 is either H or a 1~3C saturated alkyl group, and R2 is either a 1~30C saturated alkyl group or unsaturated alkyl group.)

However, depending on the type of pigment, there may be cases in which Pigment Composition 1 accomplishes an improvement in pigment dispersibility, but not in the flow properties of the pigment dispersion liquid. It is thought that the reason for this is because Compound 1 does not have an effective action on the pigment.

In order to resolve this problem, the present inventors prepared pigment mixtures that contained sub-pigments, pigment derivatives, and dyes in addition to the pigment (main pigment), and, as a result, improved pigment dispersibility by controlling crystallization and aggregation of the pigment particles. However, in general, a notable reciprocal relationship appeared between improving pigment dispersibility and improving the flow properties of the dispersion liquid, such that the flow properties of the dispersion liquid deteriorated when pigment dispersibility improved (and in particular, as microdispersion of the pigment progressed). Without exception, the aforementioned pigment mixtures also demonstrated a deterioration in the flow properties of the dispersion liquid.

The present inventors next prepared pigment compositions consisting of the aforementioned pigment mixtures and Compound 1, and, as a result, were successful at improving the flow properties of the pigment dispersion liquid while maintaining a state of high pigment dispersibility. This pigment composition is denoted as "Pigment Composition 2". Pigment Composition 2 consists of a main pigment component, color component (a sub-pigment, pigment derivative, or dye in particular), and Compound 1. Any pigment may be used as the main pigment. Excellent pigment dispersibility and dispersion liquid flow properties are obtained.

It is preferable to employ an acidic pigment, an acidic pigment derivative and an acidic dye for the sub-pigment, pigment derivative, and dye that form Pigment Composition 2. It is even more preferable to employ a sub-pigment containing a sulfonic acid group, a pigment derivative containing a sulfonic acid group, and a dye containing a sulfonic acid group.

Pigment Composition 1 and Pigment Composition 2 demonstrate excellent effects with respect to pigment dispersibility and dispersion liquid flow properties. Accordingly, when these pigment compositions are employed as a material for a color filter, a uniform quality paint film having high contrast can be obtained.

A pigment dispersion liquid in which a pigment or a pigment mixture is dispersed will now be explained. Typically, at least a pigment, resin, and solvent are combined when preparing a pigment dispersion liquid. In general, in order to improve the pigment dispersibility and dispersion liquid flow properties, the resin cannot be omitted. However, a pigment dispersion liquid in which Pigment Composition 1 or Pigment Composition 2 are dispersed in a solvent alone has excellent pigment dispersibility and dispersion liquid flow properties. In addition, effects similar to the case where employing Pigment Composition 1 or Pigment Composition 2 can be anticipated if Compound 1 is added when dispersing a pigment or pigment mixture in a solvent.

If a monomer or resin is included when dispersing Pigment Composition 1 or Pigment Composition 2 in a solvent, then pigment dispersibility and the flow properties of the dispersion liquid improve as compared to the case where dispersing in a solvent alone. In particular, it is preferable to use an acrylic monomer or an acrylic resin.

In order to further improve pigment dispersibility and the flow properties of the dispersion liquid, it is effective to include a chain compound (Compound 2) expressed by the following chemical formula (II) and/or a cyclic compound (Compound 3) having one set or more of the bonds expressed by the following chemical formula (III) as a dispersion enhancer. When Compound 2 or Compound 3 is an amide compound in particular, then an even better effect can be anticipated.

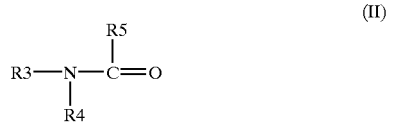

(II)

(Where R3 and R4 are independently H, a saturated alkyl group or unsaturated alkyl group respectively, and R5 is either H, hydroxyl group, saturated alkyl group, unsaturated alkyl group, saturated alkoxy group, or unsaturated alkoxy group.)

(III)

(Where, R6 is H, saturated alkyl group or unsaturated alkyl group.)

The present invention's pigment dispersion liquid is particular suitable for use in a color filter. Due to its good pigment dispersibility and dispersion liquid flow properties, a uniform paint film having high contrast can be obtained. In addition, if the present invention's pigment composition or pigment dispersion liquid is included in a photopolymerizable resin composition consisting of at least a photopolymerizable monomer and/or oligmer and a photopolymerization initiator, then employment is possible as a color resist for a color filter capable of forming an optional pattern by coating, exposing and developing the resin composition.

PREFERRED EMBODIMENTS OF THE PRESENT INVENTION

Typical and preferred embodiments of the present invention will now be explained concretely using the following examples. Each of the various compositional requirements that can be selected when executing the present invention will be explained in detail below.

Pigment Composition 1 in the present invention includes a pigment and a Compound 1 expressed by the preceding chemical formula (I) as essential components.

Various methods are available for preparing Pigment Composition 1 in the case where Compound 1 is a liquid, such as a method in which Compound 1 is added to a pigment slurry, and then stirred, filtered, washed, dried, and ground; a method in which the pigment is added into Compound 1, and stirred, filtered, dried and ground; or a method in which the required amount of Compound 1 is added in liquid form to the pigment, and then treated in a kneader, attritor, Henschel mixer or the like.

In the case where Compound 1 is a solid, available approaches include a method in which Compound 1 in solid form is kneaded into the pigment in a kneader; a method in which Compound 1 and the pigment are introduced into a medium in which Compound 1 in solid form will dissolve, and are stirred, filtered, dried and ground; or a method in which Compound 1 is added to a pigment slurry, heated to melt, and then stirred, filtered, washed, dried and ground.

Pigment Composition 2 in the present invention consists of the aforementioned Compound 1 and a pigment mixture containing a sub-pigment, pigment derivative and dye in addition to the pigment (main pigment).

Such methods are available for preparing the pigment mixture as a method in which a sub-pigment slurry, pigment derivative slurry, or dye slurry are compounded with the main pigment slurry, stirred, and then filtered, washed, dried, and ground; or a method using a dry blend of the powders. Accordingly, it is not absolutely essential that the surface of the main pigment particles be treated with the sub-pigment, pigment derivative, or dye, nor is it essential to select a sub-pigment, pigment derivative or dye that has a structure resembling that of the main pigment.

Various methods are available for preparing Pigment Composition 2 in the case where Compound 1 is a liquid, such as a method in which a sub-pigment slurry, pigment derivative slurry and dye slurry are added to the main pigment slurry, Compound 1 is added to this mixture, and the mixture is then stirred, filtered, washed, dried, and ground; a method in which the aforementioned pigment mixture is added to Compound 1, and stirred, filtered, dried and ground; and a method in which the required amount of Compound 1 is added to the pigment mixture, and then treated in a kneader, attritor, Henschel mixer or the like.

In the case where Compound 1 is a solid, available approaches include a method in which Compound 1 in solid form is kneaded into the pigment mixture in a kneader; a method in which Compound 1 and the pigment mixture are introduced into a medium in which Compound 1 in solid form will dissolve, and are stirred, filtered, dried and ground; and a method in which a sub-pigment slurry, pigment derivative slurry, and a dye slurry are added to the main pigment slurry, Compound 1 is added, heated to melt, and then stirred, filtered, washed, dried and ground.

The amount of Compound 1 that is employed to obtain the desired effect in the present invention's Pigment Composition 1 or Pigment Composition 2 will differ according to the compound. Roughly, however, this amount is in the range of about 0.5~30 wt % with respect to the pigment, or within the range of 2~15 wt % to obtain even stronger effects. If too small an amount of Compound 1 is employed, then efficacy cannot be anticipated, while if too large an amount is employed, then negative effects result.

The starting materials that can be employed when preparing Pigment Composition 1 and Pigment Composition 2 will now be discussed.

Various materials that employ organic and inorganic pigments can be used as the main pigment, sub-pigment, pigment derivative, and dye.

The material employing an organic pigment is not particularly restricted, with examples including phthalocyanines, anthraquinones, dioxidienes, quinacridones, quinacridone quinones, anthrapyrimidines, anthanthrones, indanthrones, flavanthrones, perylenes, perinones, diketopyrrolopyrroles, quinophthalones, indigos, thioindigos, isoindolinones, isoindolines, benzimidazolones, azo-compounds, and the like.

The material employing an inorganic pigment is not particularly restricted, with examples including carbon, titanium, barium, aluminum, calcium, iron, lead, and cobalt derivatives, among others.

For the main pigment, particularly notable effects can be obtained with diaminoanthraquinone-derived red pigments, phthalocyanine-derived green pigments, and phthalocyanine-derived blue pigments.

For the sub-pigment, pigment derivative, and dye, particularly notable effects can be obtained with acidic pigments, acidic pigment derivatives and acidic dyes derived from phthalocyanines, diaminoanthraquinones, quinacridones, disazo compounds, isoindolinones, isoindolines, diketipyrrolopyrroles, and the like. In addition, materials containing a sulfonic acid group in the pigment, pigment derivative or dye are particularly preferred.

The optimal structure for the starting material forming Pigment Composition 2 is one which combines the main pigment with an acidic sub-pigment, acidic pigment derivative, and acidic dye that have structures similar to the main pigment. Good effects can be anticipated as a result.

Materials that can be employed as Compound 1 composing Pigment Composition 1 and Pigment Composition 2 are not particularly restricted, with examples thereof including such fatty acid esters as ethyl acetate, butyl acetate, stearyl acetate, oleyl acetate, butyl formate, stearyl formate, oleyl formate, butyl propionate, stearyl propionat, oleyl propionate, butyl butyrate, stearyl butyrate, oleyl butyrate and the like. Acetic acid ester derived compounds are particularly effective.

Next, the dispersion of the pigment, pigment mixture, or pigment composition will be explained.

An explanation will first be made of the case where adding Compound 1 when dispersing the pigment or pigment mixture. It is preferable to add Compound 1 prior to dispersing, however during dispersing is also acceptable. Note, however, that in the case where adding Compound 1 after the dispersion, it is preferable to employ a compound that readily dissolves and diffuses widely. Dispersing devices that can be employed here include a roll mill, ball mill, beads mill, attritor, dispersing and stirring device, and the like. In order to obtain good efficacy of Compound 1 with respect to the pigment or pigment mixture, it is preferable to employ a dispersing device such as a roll mill to carry out a dispersion (hard knead) in a mixture having a high non-volatile quantity. As needed, this may be adjusted to a mixture in which the non-volatile quantity has been suitably lowered, and then dispersed in a beads mill or the like. A dispersion enhancer such as described below may be employed in this case. In particular, the pigment dispersibility and the flow qualities of the dispersion liquid are further improved if a chain compound (Compound 2) expressed by the preceding chemical formula (II) and/or a ring compound (Compound 3) having one set or more of the bonds expressed by the preceding chemical formula (III), are used together with a urethane compound, preferably a polyurethane compound, that is employed as a dispersion enhancer.

Next, an explanation will be made of the case where Pigment Composition 2 and Pigment Composition 1 containing Compound 1 are dispersed. A dispersing device such as disclosed in the explanation for dispersing the pigment mixture may be employed. Pigment Composition 1 and Pigment Composition 2 have good pigment dispersibility and dispersion liquid flow qualities even when employed alone. However, in this case as well, a further improvement in pigment dispersibility and the flow qualities of the dispersion liquid are obtained if a compound from the preceding Compound 2 and/or Compound 3 and a urethane compound, preferably a polyurethane compound, that is employed as a dispersion enhancer are also used.

Dispersion enhancers that can be used when dispersing the pigment, pigment mixture, or pigment composition will now be listed.

Compounds falling under the category of Compound 2 are not particularly restricted, with examples including amide compounds such as formamide, N-methylformamide, N,N-dimethylformamide, N,N-diethylformamide, acetoamide, N-methylacetoamide, N,N-dimethylacetoamide, N-ethylacetoamide, and N-methylpropionamide; unsaturated fatty acid amide compounds like amide oleate; saturated fatty acid amide compounds like amide stearate; carbamic acid compounds like carbamic acid, methyl carbamate, ethyl carbamate, isopropyl carbamate, butyl carbamate, and benzyl carbamate; and urethane compounds such as N-methyl urethane and N-ethyl urethane. Amide and urethane compounds are particularly effective, however.

Compounds falling under the category of Compound 3 are not particularly restricted, with examples including lactam compounds such as γ-butyrolactam, N-methyl-2-pyrrolidone, N-ethyl-2-pyrrolidone, N-propyl-2-pyrrolidone, N-isopropyl-2-pyrrolidone, N-butyl-2- pyrrolidone, γ-valerolactam, N-methyl-γ-valerolactam, N-ethyl-γ-valerolactam, α-piperidone, N-methyl-α-piperidone, caprolactam, and N-methylcaprolactam; barbituric acid compounds such as barbituric acid and 1,3-dimethylbarbituric acid; imide compounds such as phthalimide and N-methylphthalimide; isocyanuric acid compounds such as isocyanuric acid, isocyanuric acid monomethyl ester, and isocyanuric acid monoethyl ester; and diketopyrrolopyrrole compounds. Lactam and barbituric acid compounds are particularly effective, however.

Use of other dispersion enhancers is not particularly restricted, with applicable examples including such resin dispersers as polyamide and polyurethane compounds {commercially available products include: DISPERBYK 130, DISPERBYK 161, DISPERBYK 162, DISPERBYK 163, DISPERBYK 170, EFKA 46, and EFKA 47 (all brand names)}. In addition to Compound 2 and/or Compound 3, it is also acceptable to use resin dispersing agents such as acrylics, polyethylenes, and polyesters; leveling agents such as silicons and non-silicons; coupling agents such as silanes and aluminums; and anionic, cationic and nonionic surface active agents.

The resins which can be employed when dispersing the pigment or pigment composition are not particularly restricted, with examples including alkyd resins, acryl resins, melamine resins, urethane resins, epoxy resins, silicon resins, polyester resins, polyamide acid resins, polyimide resins, styrene maleic acid resins, styrene anhydrous maleic acid resins, and the like. Various types of acrylic acid monomers and acrylate monomers may also be used. Examples of particularly preferred resins and monomers include urethane resins, acrylic resins, and acrylic monomers.

Solvents which can be employed when dispersing the pigment or pigment composition are not particularly restricted, with examples including aromatic solvents like toluene, xylene, and methoxybenzene; ester acetate solvents like ethyl acetate, butyl acetate, propylene glycol monomethyl ether acetate, propylene glycol monoethyl ether acetate, and the like; propionate solvents like ethoxyethylpropionate; alcohol solvents like methanol and ethanol; ether solvents like butylcellusolve, propylene glycol monomethyl ether, diethylene glycol ethyl ether, and diethylene glycol dimethyl ether; ketone solvents like methylethylketone, methylisobutylketone, and cyclohexanone; aliphatic hydrocarbon solvents like hexane; nitrogenous compound solvents like N,N-dimethylformamide, γ-butyrolactam, N-methyl-2-pyrrolidone, aniline, and pyridine; lactone solvents like γ-butyrolactone; carbaminic acid esters such as a 48:52 mixture of methyl carbamate and ethyl carbamate; and water. In particular, significant effects are obtained when a polar solvent is employed.

The structure and method for preparing Pigment Composition 1, Pigment Composition 2, the pigment mixture, and the pigment dispersion liquid were discussed above. The most effective order for adding Compound 1 and Compound 2 and/or Compound 3 is as follows:

1. Add at the stage where preparing Pigment Composition 1 or Pigment Composition 2.
2. Add at the stage where preparing the pigment dispersion liquid (a significant effect is obtained in the case of dispersion using a hard knead).
3. Add after preparing the pigment dispersion liquid.

Next, the method for preparing the color resist for a color filter will be discussed. Basically, a color resist for a color filter can be prepared by adding a solvent, photopolymerization initiator, and photopolymerizable monomer in suitable quantities while stirring a pigment dispersion liquid prepared as described above in a dispersing and stirring device.

The photopolymerizable monomer that can be employed to prepare a color resist for a color filter is not particularly restricted, with examples thereof including such bifunctional monomers as 1, 6-hexane diol diacrylate, ethylene glycol diacrylate, neopentyl glycol diacrylate, triethylene glycol diacrylate, bis(acryloxyethoxy)bisphenol A, and 3-methylpentane diol diacrylate; and such multifunctional monomers as trimethylol propatone triacrylate, pentaerythitol triacrylate, tris(2-hydroxyethyl)isocyanate, dipentaerythitol hexacrylate, dipentaerythritol pentacrylate and the like. A multifunctional monomer is particularly suitable.

The photopolymerization initiator employed when preparing the color resist for the color filter is not particularly restricted, with examples thereof including acetophenone, benzophenone, benzyldimethylketanol, benzoyl peroxide, 2-chlorothioxanthone, 1,3-bis(4'-azidobenzal)-2-propane, 1,3-bis(4'-azidobenzal)-2-propane-2'-sulfonic acid, 4,4'-diazidostilbene-2,2'-disulfonic acid, halomethyl oxadiazole, halomethyl-s-triazine, and the like. In particular, 1,3-bis(4'-azidobenzal)-2-propane-2'-sulfonic acid and 4,4'-diazidostilbene-2,2'-disulfonic acid are preferred from the perspective of flow properties and solvency.

Solvents that can be employed when preparing the color resist for the color filter are not particularly restricted, with relatively hydrophilic compounds from among polar solvents like propionates, alcohols, ethers, ketones, nitrogenous compounds, lactones, and water being particularly suitable from among the solvents listed above.

EXAMPLES

The present invention will now be explained concretely employing examples and comparative examples. The present invention is not limited to these however. For the most part, the starting materials employed in the following examples and comparative examples were manufactured by Dainippon Ink and Chemicals Inc. In the case of products manufactured by other companies, the manufacturer has been noted with parentheses. Also, the term "parts" as employed below is a mass standard.

The dispersion method when forming the pigment dispersion liquid and the method for evaluating the dispersion liquid are as follows. 200 parts of 0.5 mmφ SEPR beads (SAINT-GOBAIN) were added to a mixed solution containing the various starting materials. Dispersing was then carried out for one hour in a paint conditioner manufactured by TOYO SEIKI, to formulate the pigment dispersion liquid. Then, the 10 rpm viscosity of the pigment dispersion liquid was measured in an E-type viscosity meter manufactured by Tokimec Inc. This pigment dispersion liquid was then coated with an applicator to a 1 mm thick glass plate, and baked and dried for 10 minutes at 140° C., to form a coated plate on which a paint film having a dried thickness of 1 μm was formed. The paint film's 20°—20° gloss was measured using a Murakami Color Research Laboratory's GM-26D in the following arrangement while shading the paint film's contrast.

backlight/polarizing film 1/coated plate/polarizing film 2/color brightness meter Backlight: LCD light (Meitaku System)
Polarizing films 1,2: NPF-G1220DUN (Nitto Denko Corp.)
Color brightness meter: BM-7 (Topcon Corp.)

Example 1

5 parts of oleyl acetate were added to a C.I. Pigment Green 36 pigment slurry (containing 100 parts pigment solid component), and heated and stirred for 30 minutes at 70° C. The mixture was then filtered, washed, dried at 90° C., and ground, to obtain a pigment composition having as its main component C.I. Pigment Green 36. This composition was designated "G1-1".

Example 2

A slurry of sulfonated copper phthalocyanine pigment (containing 5 parts solid component) was added to a C.I. Pigment Green 36 pigment slurry (containing 95 parts pigment solid component) adjusted to a pH of 8.5~9.0 while stirring the latter. The mixture was then heated for 30 minutes at 70° C. After heating, the pH was adjusted to 6.0~6.5, and the mixture was filtered, washed, dried at 90° C., and ground, to obtain a pigment mixture having as its main component C.I. Pigment Green 36. This composition was designated "G2-1".

Example 3

A slurry of sulfonated copper phthalocyanine pigment (containing 5 parts solid component) and 5 parts oleyl acetate were added to a C.I. Pigment Green 36 pigment slurry (containing 95 parts pigment solid component) adjusted to a pH of 8.5~9.0 while stirring the latter. The mixture was then heated for 30 minutes at 70° C. After heating, the pH was adjusted to 6.0~6.5, and the mixture was filtered, washed, dried at 90° C., and ground, to obtain a pigment composition having as its main component C.I. Pigment Green 36. This composition was designated "G3-1".

Example 4

A slurry of sulfonated copper phthalocyanine pigment (containing 5 parts solid component) and 10 parts butyl acetate (Daicel Chemical Industries, Ltd.) were added to a C.I. Pigment Blue 15:6 pigment slurry (containing 95 parts pigment solid component) adjusted to a pH of 8.5~9.0, and stirred for 60 minutes. The mixture pH was then adjusted to 6.0~6.5, and the mixture was filtered, washed, dried at 90° C., and ground, to obtain a pigment composition having as its main component C.I. Pigment Blue 15:6. This composition was designated "B3-1".

Example 5

A slurry of sulfonated copper phthalocyanine pigment (containing 5 parts solid component) and 10 parts n-butyl formate were added to a C.I. Pigment Blue 15:6 pigment slurry (containing 95 parts pigment solid component) adjusted to a pH of 8.5~9.0, and stirred for 60 minutes. The mixture pH was then adjusted to 6.0~6.5, and the mixture was filtered, washed, dried at 90° C., and ground, to obtain a pigment composition having as its main component C.I. Pigment Blue 15:6. This composition was designated "B3-2".

Example 6

A slurry of sulfonated copper phthalocyanine pigment (containing 5parts solid component) and 10 parts n-butyl propionate were added to a C.I. Pigment Blue 15:6 pigment slurry (containing 95 parts pigment solid component) adjusted to a pH of 8.5~9.0, and stirred for 60 minutes. The mixture pH was then adjusted to 6.0~6.5, and the mixture was filtered, washed, dried at 90° C., and ground, to obtain a pigment composition having as its main component C.I. Pigment Blue 15:6. This composition was designated "B3-3".

Example 7

A slurry of sulfonated copper phthalocyanine pigment (containing 5 parts solid component) and 5 parts n-octadecyl acetate were added to a C. I. Pigment Blue 15:6 pigment slurry (containing 95 parts pigment solid component) adjusted to a pH of 8.5~9.0, and heated and stirred for 30 minutes at 70° C. The mixture pH was then adjusted to 6.0~6.5, and the mixture was filtered, washed, dried at 90° C., and ground, to obtain a pigment composition having as its main component C.I. Pigment Blue 15:6. This composition was designated "B3-4".

Example 8

A slurry of sulfonated copper phthalocyanine pigment (containing 5 parts solid component) was added to a C.I. Pigment Blue 15:6 pigment slurry (containing 95 parts pigment solid component) adjusted to a pH of 8.5~9.0 while stirring the latter. The mixture was then heated for 30 minutes at 70° C. After heating, the pH was adjusted to 6.0~6.5, and the mixture was filtered, washed, dried at 90° C., and ground, to obtain a pigment mixture having as its main component C.I. Pigment Blue 15:6. This composition was designated "B2-1".

Examples of the pigment dispersion liquid will now be explained.

Example 9

This example describes the dispersion of G1-1 containing Compound 1.

| | |
|---|---|
| G1-1 | 20.00 parts |
| EFKA-46 (EFKA) | 10.00 parts |
| (urethane system dispersing agent, hereinafter the same) | |
| UCAR ESTER EEP (Union Carbide Corp.) | 35.00 parts |
| (propionate system solvent, hereinafter the same) | |
| PMA (Kyowa Hakko Kogyo Co., Ltd.) | 35.00 parts |
| (acetic acid ester system solvent, hereinafter the same) | |
| Total | 100.00 parts |

After dispersing the mixture of the above composition, the dispersion liquid flow properties and paint film state were evaluated. These results are shown in Table 1. This example's liquid flow properties clearly demonstrated a low value for the 10 rpm viscosity as compared to the dispersion liquid of Comparative Example 1. In addition, a higher value was obtained for the gloss of the paint film as compared to that of Comparative Example 1.

Comparative Example 1

This example describes the dispersion of C.I. Pigment Green 36 untreated pigment.

| | | |
|---|---|---|
| C.I. Pigment Green 36 untreated pigment | 20.00 parts | |
| EFKA-46 (EFKA) | 10.00 parts | |
| UCAR ESTER EEP (Union Carbide Corp.) | 35.00 parts | |
| PMA (Kyowa Hakko Kogyo Co., Ltd.) | 35.00 parts | |
| Total | 100.00 parts | |

After dispersing the mixture of the above composition, the dispersion liquid flow properties and paint film state were evaluated. These results are shown in Table 1.

TABLE 1

Dispersing paste for green pigment

| | 10 rpm viscosity units: mPa · s | Paint film gloss |
|---|---|---|
| Example 9 | 144 | 81 |
| Comparative Example 1 | 1630 | 38 |

Example 10

This example describes the dispersion of G3-1 containing Compound 1.

| | |
|---|---|
| G3-1 | 20.00 parts |
| EFKA-46 (EFKA) | 10.00 parts |
| UCAR ESTER EEP (Union Carbide Corp.) | 35.00 parts |
| PMA (Kyowa Hakko Kogyo Co., Ltd.) | 35.00 parts |
| Total | 100.00 parts |

After dispersing the mixture of the above composition, the dispersion liquid flow properties and paint film state were evaluated. These results are shown in Table 2. This example's liquid flow properties clearly demonstrated a low value for the 10 rpm viscosity as compared to the dispersion liquid of Comparative Example 2. In addition, a higher value was obtained for the gloss of the paint film as compared to that of Comparative Example 2.

Comparative Example 2

This example describes the dispersion of G2-1 not containing Compound 1.

| | |
|---|---|
| G2-1 | 20.00 parts |
| EFKA-46 (EFKA) | 10.00 parts |
| UCAR ESTER EEP (Union Carbide Corp.) | 35.00 parts |
| PMA (Kyowa Hakko Kogyo Co., Ltd.) | 35.00 parts |
| Total | 100.00 parts |

After dispersing the mixture of the above composition, the dispersion liquid flow properties and paint film state were evaluated. These results are shown in Table 2.

TABLE 2

Dispersing paste for green pigment

| | 10 rpm viscosity units: mPa · s | Paint film gloss |
|---|---|---|
| Example 10 | 108 | 85 |
| Comparative Example 2 | 582 | 44 |

Example 11

This example describes the dispersion of B3-1 containing Compound 1.

| | |
|---|---|
| B3-1 | 20.00 parts |
| EFKA-46 (EFKA) | 10.00 parts |
| PMA (Kyowa Hakko Kogyo Co., Ltd.) | 70.00 parts |
| Total | 100.00 parts |

After dispersing the mixture of the above composition, the dispersion liquid flow properties and paint film state were evaluated. These results are shown in Table 3. With respect to the dispersion liquid flow properties, the lower the viscosity is, the more possible it is to obtain a paint film of a uniform thickness. This example's liquid flow properties clearly demonstrated a low value for the 10 rpm viscosity as compared to the dispersion liquid of Comparative Example 3. Further, the greater the paint film gloss, the more possible it is to finely disperse the pigment. In this regard as well, the present example had a higher paint film gloss than that of Comparative Example 3.

Example 12

In this example, butyl acetate given as Compound 1 was added when dispersing B2-1.

| | |
|---|---|
| B2-1 | 20.00 parts |
| butyl acetate (Daicel Chemical Industries, Ltd.) | 2.00 parts |
| EFKA-46 (EFKA) | 10.00 parts |
| PMA (Kyowa Hakko Kogyo Co., Ltd.) | 68.00 parts |
| Total | 100.00 parts |

After dispersing the mixture of the above composition, the dispersion liquid flow properties and paint film state were evaluated. These results are shown in Table 3. This example's liquid flow properties clearly demonstrated a low value for the 10 rpm viscosity as compared to the dispersion liquid of Comparative Example 3. In addition, the paint film gloss was greater than that of Comparative Example 3.

Example 13

This example describes the dispersion of B3-2 containing Compound 1.

| | |
|---|---|
| B3-2 | 20.00 parts |
| EFKA-46 (EFKA) | 10.00 parts |
| PMA (Kyowa Hakko Kogyo Co., Ltd.) | 70.00 parts |
| Total | 100.00 parts |

After dispersing the mixture of the above composition, the dispersion liquid flow properties and paint film state were evaluated. These results are shown in Table 3. This example's liquid flow properties clearly demonstrated a low value for the 10 rpm viscosity as compared to the dispersion liquid of Comparative Example 3. In addition, the paint film gloss was greater than that of Comparative Example 3.

Example 14

This example describes the dispersion of B3-3 containing Compound 1.

| | |
|---|---|
| B3-3 | 20.00 parts |
| EFKA-46 (EFKA) | 10.00 parts |
| PMA (Kyowa Hakko Kogyo Co., Ltd.) | 70.00 parts |
| Total | 100.00 parts |

After dispersing the mixture of the above composition, the dispersion liquid flow properties and paint film state were evaluated. These results are shown in Table 3. This example's liquid flow properties clearly demonstrated a low value for the 10 rpm viscosity as compared to the dispersion liquid of Comparative Example 3. In addition, the paint film gloss was greater than that of Comparative Example 3.

Example 15

This example describes the dispersion of B3-4 containing Compound 1.

| | |
|---|---|
| B3-4 | 20.00 parts |
| EFKA-46 (EFKA) | 10.00 parts |
| PMA (Kyowa Hakko Kogyo Co., Ltd.) | 70.00 parts |
| Total | 100.00 parts |

After dispersing the mixture of the above composition, the dispersion liquid flow properties and paint film state were evaluated. These results are shown in Table 3. This example's liquid flow properties clearly demonstrated a low value for the 10 rpm viscosity as compared to the dispersion liquid of Comparative Example 3. In addition, the paint film gloss was greater than that of Comparative Example 3.

Comparative Example 3

This example describes the dispersion of B2-1 which does not contain Compound 1.

| | |
|---|---|
| B2-1 | 20.00 parts |
| EFKA-46 (EFKA) | 10.00 parts |
| PMA (Kyowa Hakko Kogyo Co., Ltd.) | 70.00 parts |
| Total | 100.00 parts |

After dispersing the mixture of the above composition, the dispersion liquid flow properties and paint film state were evaluated. These results are shown in Table 3.

TABLE 3

Dispersing paste for blue pigment

| | 10 rpm viscosity units: mPa · s | Paint film gloss |
|---|---|---|
| Example 11 | 23 | 114 |
| Example 12 | 27 | 108 |
| Example 13 | 28 | 102 |
| Example 14 | 32 | 99 |
| Example 15 | 21 | 120 |
| Comparative Example 3 | 39 | 85 |

Example 16

The following examples will discuss examples of color resists for color filters.

First, a let-down clear was made with the following mix.

| | |
|---|---|
| ARONIX M7100 (Toagosei Co. Ltd.) (polyester acrylate resin) | 11.00 parts |
| KAYARAD DPHA (Nippon Kayaku Co. Ltd.) (dipentaerythritol hexacrylate, photopolymerizable monomer) | 10.00 parts |
| KAYACURE BP-100 (Nippon Kayaku Co. Ltd.) (benzophenone, photopolymerization initiator) | 2.00 parts |
| UCAR ESTER EEP (Union Carbide Corp.) | 27.00 parts |
| Total | 50.00 parts |

Next, 50 parts of a let-down clear of the above composition were dripped over 10 minutes into 50.00 parts of a pigment dispersion liquid having the composition noted in Example 10 while stirring at 500 rpm in a dispersing and stirring device. A green colored color resist was obtained following further stirring for 10 minutes. The results of an evaluation of the dispersion liquid flow properties and paint film state of this color resist are shown in Table 4. With respect to the dispersion liquid flow properties, the lower the viscosity is, the more possible it is to obtain a paint film of a uniform thickness. This example's liquid flow properties clearly demonstrated a low value for the 10 rpm viscosity as compared to the dispersion liquid of Comparative Example 4. Further, the greater the paint film gloss and paint film contrast, the more possible it is to finely disperse the pigment. In this regard as well, the present example had a higher value than that of Comparative Example 4.

Comparative Example 4

Next, 50 parts of a let-down clear of the composition noted in Example 16 were dripped over 10 minutes into 50.00 parts of a pigment dispersion liquid having the composition noted in Comparative Example 2 while stirring at 500 rpm in a dispersing and stirring device. A green colored color resist was obtained following further stirring for 10 minutes. The results of an evaluation of the dispersion liquid flow properties and paint film state of this color resist are shown in Table 4.

TABLE 4

Green color resist

|  | 10 rpm viscosity units: mPa · s | Paint film gloss | Paint film contrast |
| --- | --- | --- | --- |
| Example 16 | 7.2 | 133 | 915 |
| Comparative Example 4 | 35.6 | 112 | 797 |

Comparative Example 17

Next, 50 parts of a let-down clear of the composition noted in Example 16 were dripped over 10 minutes into 50.00 parts of a pigment dispersion liquid having the composition noted in Comparative Example 15 while stirring at 500 rpm in a dispersing and stirring device. A blue-colored color resist was obtained following further stirring for 10 minutes. The results of an evaluation of the dispersion liquid flow properties and paint film state of this color resist are shown in Table 5. The dispersion fluid flow properties and the paint film state of this example were both superior as compared to those of Comparative Example 5.

Example 18

In this example, a pigment dispersion liquid was made in which DMF (N,N-dimethylformamide/Mitsubishi Gas Chemical Company, Inc., the same hereinafter) given as Compound 2 had been added as a dispersion enhancer to the pigment dispersion liquid composition of Example 15. This was then used to form a color resist.

A pigment dispersion liquid of the following composition was formed.

| | |
| --- | --- |
| B3-4 | 20.00 parts |
| DMF (Mitsubishi Gas Chemical Company, Inc.) | 2.00 parts |
| EFKA-46 (EFKA) | 10.00 parts |
| PMA (Kyowa Hakko Kogyo Co., Ltd.) | 68.00 parts |
| Total | 100.00 parts |

Next, 50 parts of a let-down clear of the composition noted in Example 16 were dripped over 10 minutes into 50.00 parts of this pigment dispersion liquid while stirring at 500 rpm in a dispersing and stirring device. A blue-colored color resist was obtained following further stirring for 10 minutes. The results of an evaluation of the dispersion liquid flow properties and paint film state of this color resist are shown in Table 5. The dispersion fluid flow properties and the paint film state of this example were both superior as compared to Comparative Example 5. Moreover, this example demonstrated favorable results when compared to Example 17 as well.

Comparative Example 5

50 parts of a let-down clear of the composition noted in Example 16 were dripped over 10 minutes into 50.00 parts of a pigment dispersion liquid having the composition noted in Comparative Example 3 while stirring at 500 rpm in a dispersing and stirring device. A blue-colored color resist was obtained following further stirring for 10 minutes. The results of an evaluation of the dispersion liquid flow properties and paint film state of this color resist are shown in Table 5.

TABLE 5

Blue color resist

|  | 10 rpm viscosity units: mPa · s | Paint film gloss | Paint film contrast |
| --- | --- | --- | --- |
| Example 17 | 4.6 | 102 | 512 |
| Example 18 | 4.1 | 110 | 560 |
| Comparative Example 5 | 7.4 | 88 | 369 |

Industrial Field of Application

The present invention enables an improvement in the properties of the dispersion liquid and paint film of a pigment dispersion liquid that can be employed in a variety of coating materials, printing ink, color filter materials and the like beyond that provided in the conventional art at a low cost that is on par with the conventional technology. In the case where employing the present invention's pigment composition or pigment dispersion liquid in a color filter, the suitably of the paint film's gloss and contrast is greatly improved due to the increased pigment dispersibility. Thus, a uniform paint film having high contrast can be obtained.

What is claimed:

1. A pigment dispersion liquid in which a solid pigment composition containing a pigment and compound 1 expressed by the following chemical formula (I)

(where R1 is either H or a 1–3C saturated alkyl group, and R2 is either a 1–30C saturated alkyl group or an unsaturated alkyl group) is dispersed in a solvent.

2. A pigment composition according to claim 1 containing one or two or more of a sub-pigment, pigment derivative and dye.

3. A pigment composition according to claim 2 in which the sub-pigment is an acidic pigment, the pigment derivative is the derivative of an acidic pigment, and the dye is an acidic dye.

4. A pigment composition according to claim 3 in which the sub-pigment, pigment derivative and dye have a sulfonic acid group.

5. A method for preparing a color filter, comprising the steps of:
   providing a pigment dispersion liquid as disclosed in any of claims 1–4 and
   applying the pigment dispersion liquid to a filter material.

6. A color resist for a color filter containing at least a pigment composition as disclosed in any of claims 1–4 and a photopolymerizable resin composition.

7. A pigment composition according to one of claims 1–4 in which the pigment is an acidic pigment.

8. A method for preparing a color filter, comprising the steps of:
   providing a pigment dispersion liquid as disclosed in claim 7, and
   applying the pigment dispersion liquid to a filter material.

9. A color resist for a color filter containing at least a pigment composition as disclosed in claim 7 and a photopolymerizable resin composition.

10. A pigment dispersion liquid in which the pigment composition disclosed in claim 7 is dispersed in a solvent.

11. A pigment dispersion liquid according to claim 10 containing as additional components a chain compound expressed by the following chemical formula (II) and/or a cyclic compound having one set or more of the bonds expressed by the following chemical formula (III)

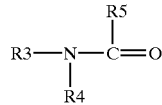
(II)

wherein R3 and R4 are independently H, a saturated alkyl group or an unsaturated alkyl group respectively, and R5 is either H, a hydroxyl group, a saturated alkyl group, an unsaturated alkyl group, a saturated alkoxy group, or an unsaturated alkoxy group

(III)

wherein, R6 is H, a saturated alkyl group or an unsaturated alkyl group.

12. A method for preparing a color filter, comprising the steps of:
providing a pigment dispersion liquid as disclosed in claim 11, and
applying the pigment dispersion liquid to a filter material.

13. A pigment dispersion liquid according to claim 10 containing an acrylic monomer as an additional component.

14. A method for preparing a color filter, comprising the steps of:
providing a pigment dispersion liquid as disclosed in claim 13, and
applying the pigment dispersion liquid to a filter material.

15. A pigment dispersion liquid according to claim 10 containing an acrylic resin as an additional component.

16. A method for preparing a color filter, comprising the steps of:
providing a pigment dispersion liquid as disclosed in claim 15, and
applying the pigment dispersion liquid to a filter material.

17. A method for preparing a color filter, comprising the steps of:
providing a pigment dispersion liquid as disclosed in claim 10, and
applying the pigment dispersion liquid to a filter material.

18. A pigment dispersion liquid according to claim 11 containing as additional components a chain compound expressed by the following chemical formula (II) and/or a cyclic compound having one set or more of the bonds expressed by the following chemical formula (III)

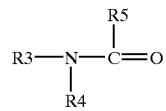
(II)

(where R3 and R4 are independently H, a saturated alkyl group or an unsaturated alkyl group respectively, and R5 is either H, an hydroxyl group, a saturated alkyl group, an unsaturated alkyl group, a saturated alkoxy group, or an unsaturated alkoxy group)

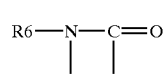
(III)

(where, R6 is H, a saturated alkyl group or an unsaturated alkyl group).

19. A method for preparing a color filter, comprising the steps of:
providing a pigment dispersion liquid as disclosed in claim 18, and
applying the pigment dispersion liquid to a filter material.

20. A pigment dispersion liquid according to claim 11 containing an acrylic monomer as an additional component.

21. A method for preparing a color filter, comprising the steps of:
providing a pigment dispersion liquid as disclosed in claim 20, and
applying the pigment dispersion liquid to a filter material.

22. A pigment dispersion liquid according to claim 11 containing an acrylic resin as an additional component.

23. A method for preparing a color filter, comprising the steps of:
providing a pigment dispersion liquid as disclosed in claim 22, and
applying the pigment dispersion liquid to a filter material.

24. A method for preparing a color filter, comprising the steps of:
providing a pigment dispersion liquid as disclosed in claim 1, and
applying the pigment dispersion liquid to a filter material.

25. A method for preparing a pigment dispersion liquid comprising the step of:
dispersing a solid pigment composition containing a pigment and Compound 1 expressed by the following chemical formula (I)

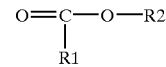
(I)

(where R1 is either H or a 1–3C saturated alkyl group, and R2 is either a 1–30C saturated alkyl group or an unsaturated alkyl group) in a solvent.

* * * * *